United States Patent [19]

Thornton et al.

[11] Patent Number: 5,446,612
[45] Date of Patent: Aug. 29, 1995

[54] SELF LOADING SUSPENSION FOR HARD DISK DRIVES

[75] Inventors: Arnold O. Thornton; Hang T. Nguyen; Greg N. Nguyen; Don P. Williams, all of San Jose, Calif.

[73] Assignee: Areal Technology, Inc., San Jose, Calif.

[21] Appl. No.: 216,222

[22] Filed: Mar. 22, 1994

[51] Int. Cl.⁶ .............................................. G11B 5/48
[52] U.S. Cl. ................................................... 360/104
[58] Field of Search ........................................ 360/104

[56] References Cited

U.S. PATENT DOCUMENTS

| 5,079,660 | 1/1992 | Yumamura et al. | |
| 5,115,363 | 5/1992 | Khan et al. | |
| 5,138,507 | 8/1992 | Zarouri et al. | |
| 5,166,845 | 11/1992 | Thompson | 360/104 |
| 5,235,484 | 8/1993 | Maruyama | 360/104 |

FOREIGN PATENT DOCUMENTS 90314434.3 12/1990 European Pat. Off. .

Primary Examiner—A. J. Heinz
Attorney, Agent, or Firm—Graham & James

[57] ABSTRACT

A head suspension assembly for a hard disk drive data storage device which prevents contact between the head portion of the mechanism and the surface of the data storage media. An arm member includes a head assembly secured to one end and a bushing at the other end for engaging a rotatable positioning shaft. The arm member applies a resilient beam loading force to urge the arm member away from the media, and includes an aerodynamic airfoil that interacts with the air flow adjacent to the media surface to oppose the beam loading force and move the arm member toward the media to a proper flying height. When the disk is spinning, the negative lift of the airfoil opposes the resilient loading of the arm member and urges the arm member closer to the surface of the rotating media. As the head approaches the rotating surface, the positive lift of the air bearing counterbalances the negative lift from the airfoil such that a dynamic equilibrium is established at a predetermined flying height. The assembly intrinsically prevents head-to-disk stiction and may minimize head crashes that are normally caused by excessive preload.

2 Claims, 2 Drawing Sheets

SELF LOADING SUSPENSION FOR HARD DISK DRIVES

BACKGROUND OF THE INVENTION

This invention generally relates to data storage devices for use with computers, and more particularly to hard disk drives.

Hard disk drives, also known as Winchester disk drives, are widely used within computer and electronic devices to store data. The relatively recent growth in demand for portable computers and removable hard disk devices has created a greater demand for damage tolerant drives that are resistant to mechanical shock. Furthermore, the introduction of sleep mode operation of hard disk drives to conserve energy has increased the number of start/stop cycles the drive must withstand, creating an additional need for increased durability.

A typical hard disk drive is composed of three major components: the electronics, the mechanics, and the media. The media portion of the drive generally comprises a disk which is coated with a material that is capable of recording data that is readable and writable by one or more heads. The material records the data in magnetic, optical, or magneto-optical modes, and the heads are appropriately designed to read and write the material coating the disk. The drive mechanics consist of the components necessary to rotate the media at a predetermined velocity and at a stable mechanical position. It also includes a suspension system for selectively positioning the heads at variable radial positions of the disk, as well as the components required for structural stability and an enclosed, clean operating environment. The drive electronics provide control, timing, data interpretation and transmission through an interface to other internal and external systems.

Information is stored in and retrieved from the media by means of read and write heads that write discretely polarized domains along tracks in the media to represent bits. These zones are detectable by the read head(s) moving over the tracks and sensing the changes in polarization of the domains. Among the many components within a disk drive, the interface between the read/write data heads and the storage media is the most sensitive to damage. Damage can occur during operation if a sudden impact causes the heads, which normally fly at a small distance above the surface of the rotating media, to crash or momentarily contact the rapidly spinning media. Any impact has the potential to cause a surface scratch or degradation that can diminish or destroy the usefulness of the media.

During non-operation a sudden impact can also cause damage to the media by causing the heads to move with respect to the media and damage the media either by the sliding action or impact due to momentary head-from-media separation (e.g., head slap). In addition, damage can occur during repeated start and stop operations in which the head must undergo a transition from media contact at zero media velocity to flying above the rotating media for read/write operation, and then re-land upon the media at the completion of use. For this reason, many schemes have been devised to minimize the potential for damage during head take off/landing and during head storage.

Typically, the read and write heads are suspended over the storage media by means of a flexible arm member commonly referred to as the head suspension assembly, or suspension. The suspension supports and positions the head, or slider, and applies a predetermined loading force which biases the slider toward impingement on the media. The slider is conformed to create lift when the media is rotating and a film of air is circulating with the disk, so that the slider is in stable flight spaced closely above the surface of the media. When the drive is first activated, the motor which rotates the disk must overcome the frictional forces created by the head dragging on the disk. The head must slide against the surface until sufficient air velocity is created under it to lift the head to its operational flying height. At this point, the slider lift counterbalances the suspension loading force. When the operation stops, the media is allowed to spin down, the air bearing collapses and the slider re-lands onto the media.

One approach in the prior art to overcoming the problems caused by the heads repeatedly taking off and landing on the media is to provide a ramp device, and drive the suspension to park on the ramp device whenever the media is rotating at less than air bearing velocity. Thus the slider is prevented from ever contacting the media. However, this arrangement does not prevent damage due to head slap while the disk system is operating. Indeed, portable and laptop computers often undergo movement during disk system operation, so the ramp device does not address a significant cause of media damage. Also, the ramp device is a generally stationary structure that does not engender the air bearing supporting the head assembly. Therefore, parking of the suspension on a ramp is unpredictable and disengagement of the suspension from the ramp clan create severe transient head flight instability and potential head crashing.

SUMMARY OF THE INVENTION

The invention generally comprises a new head suspension assembly for a hard disk drive data storage device. A significant feature of the invention is that it is designed inherently to prevent contact between the head portion of the mechanism and the surface of the data storage media. The head suspension assembly includes an arm member having a head secured to one end, and a bushing at the other end for engaging a rotatable positioning shaft. The arm member is configured to apply a resilient force to urge the arm member away from the media. The arm member includes an aerodynamic vane, or airfoil that interacts with the air flow adjacent to the media surface, the airfoil creating a negative lift that urges the arm member toward the media only when the disk is rotating. In addition, the head is conformed to generate an air bearing and fly closely above the surface of the media, as has been known in the prior art. When the disk is spinning, the negative lift of the airfoil opposes the resilient loading of the arm member and urges the arm member closer to the surface of the rotating media. As the head approaches the rotating surface, the positive lift of the air bearing counterbalances the negative lift from the vane such that a dynamic equilibrium is established at a predetermined flying height.

When the drive is deactivated, such as in a sleep mode or upon shutdown of a computer system, the media slows and the air velocity-induced airfoil force diminishes, thereby causing the spring force of the suspension to raise the heads from the media and retract into a storage position. The operation of this system is completely opposite that of prior art disk drive access systems, in which the suspension is loaded or biased to converge toward the media surface. The introduction of a diverging loading force on the suspension arm determines that the heads inherently do not approach the media unless there is sufficient negative lift from the airfoil to overcome the diverging loading force. Thus the media must be rotating to bring the heads into close spacing to the surface of the media, where the air bearing takes effect to prevent contact. The system consequently prevents contact between the heads and the media without reliance on any form of ramp device. In addition, the system tends to reduce head slap.

For a fuller understanding of the nature and advantages of the invention, reference should be had to the ensuing detailed description taken in conjunction with the accompanying drawings.

DETAILED DESCRIPTION OF THE PREFERRED EMBODIMENTS

The invention generally comprises a novel head suspension arrangement for use in supporting read and write heads operatively associated with a rotating data storage medium. Although the invention will be described with reference to a magnetic hard disk, or Winchester, drive, it is noted that the invention can also be used with optical and magneto-optical data storage media.

Figure 1:
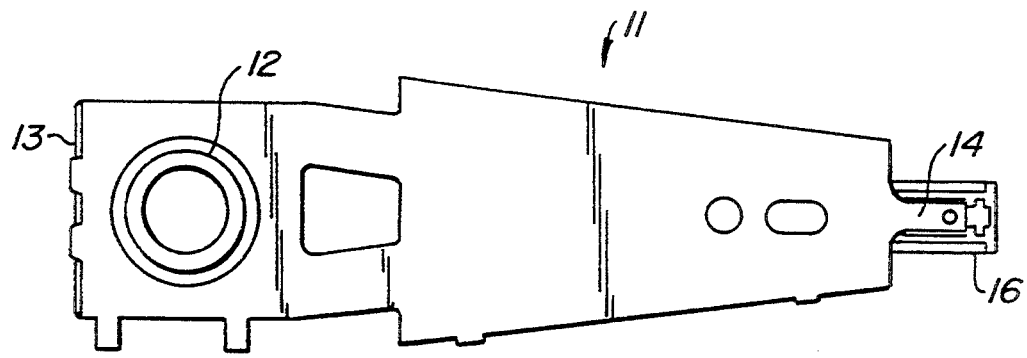
FIG. 1 is a plan view of a typical prior art head suspension arm assembly.
Figure 2:
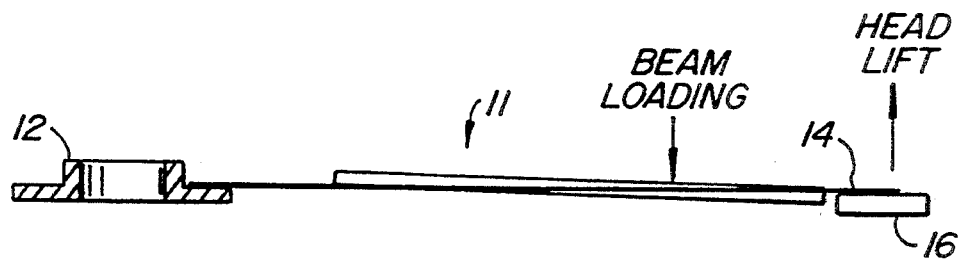
FIG. 2 is a side elevation of the typical prior art head suspension arm assembly shown in FIG. 1.

A typical prior art head suspension assembly, depicted in FIGS. 1 and 2, includes a beam-like arm assembly 11. The arm assembly 11 includes a bushing 12 at an outer end 13 for engaging a selectively rotatable positioning shaft. At the inner end of the arm assembly, a tongue 14 extends axially with respect to the arm assembly and supports a head assembly 16. The arm 11 is broad in lateral width to provide a high stiffness characteristic perpendicular to both the longitudinal axis of the arm and the axis of the positioning shaft in the bushing 12. The arm is very thin and flexible in the direction normal to the plane of the disk, to provide a high compliance characteristic. The head assembly is provided with an aerodynamic conformation so that air flow created at the surface of a rapidly rotating data storage disk will cause the head assembly 16 to generate lift and fly in close spacing above the surface of the rotating disk. The arm assembly 16 is provided with a resilient bias toward the rotating disk, so that the arm assembly is pre-loaded to impinge on the disk surface. Thus, as explained previously, the arm is pre-disposed to urge the head assembly to impinge on the surface of the data storage disk, and the aerodynamic lift of the head assembly acting in the high compliance direction of the arm causes the heads to take off from the surface as the media attains operational rotational velocity. The relationship of the intrinsic arm bias toward the disk and the opposing head lift is primarily responsible for the head crash and head slap problems of prior art disk drive systems.

Figure 3:
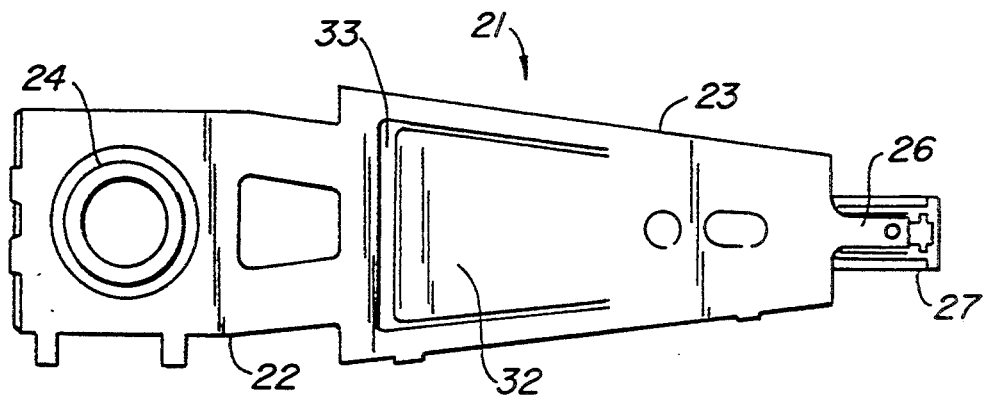
FIG. 3 is a plan view of the head suspension arm assembly of the invention.
Figure 4:
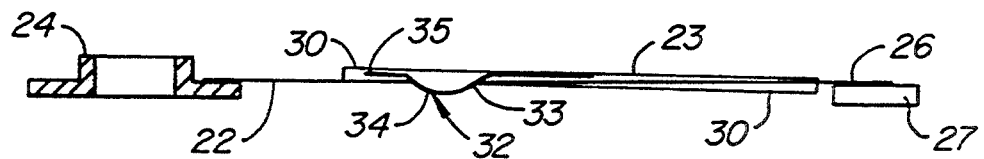
FIG. 4 is a side elevation of the head suspension arm assembly of the invention shown in FIG. 3.
Figure 5:
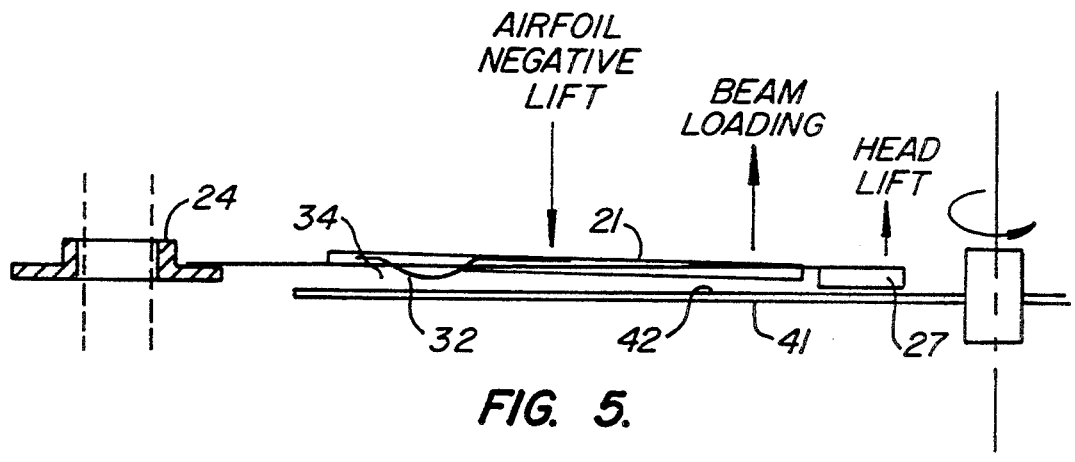
FIG. 5 is a schematic elevation of the head suspension arm assembly of the invention, depicting the major forces acting on it to control its position with respect to a data storage disk.

With reference to FIGS. 3 and 4, the new head suspension arrangement of the invention includes an arm assembly 21 comprised of a generally planar web having a proximal end portion 22 and a trapezoidal medial portion 23. A bushing 24 is supported in the proximal end portion 22 to engage a selectively rotatable positioning shaft. Extending longitudinally from the distal end of the portion 23 is a tongue 26, and a read/write head assembly 27 is supported by the tongue 26. As in the prior art devices, the arm assembly is wide in lateral width to provide lateral stiffness, while the planar configuration of the web provides substantial compliance perpendicular to the plane of the web. In addition, drop-edge flanges 30 are formed along laterally opposed sides of the trapezoidal portion 23 to increase the stiffness of that portion of the arm assembly in a direction perpendicular to the web.

The arm assembly 21 is provided with a conformation that imparts a resilient beam loading force directed normally with respect to the longitudinal axis of the arm assembly and to the plane of the web section of the arm assembly. The arm assembly 21 may be curved slightly from the plane of the web section to create an intrinsic, resilient beam loading force directed away from the rotating data storage media.

Figure 6:
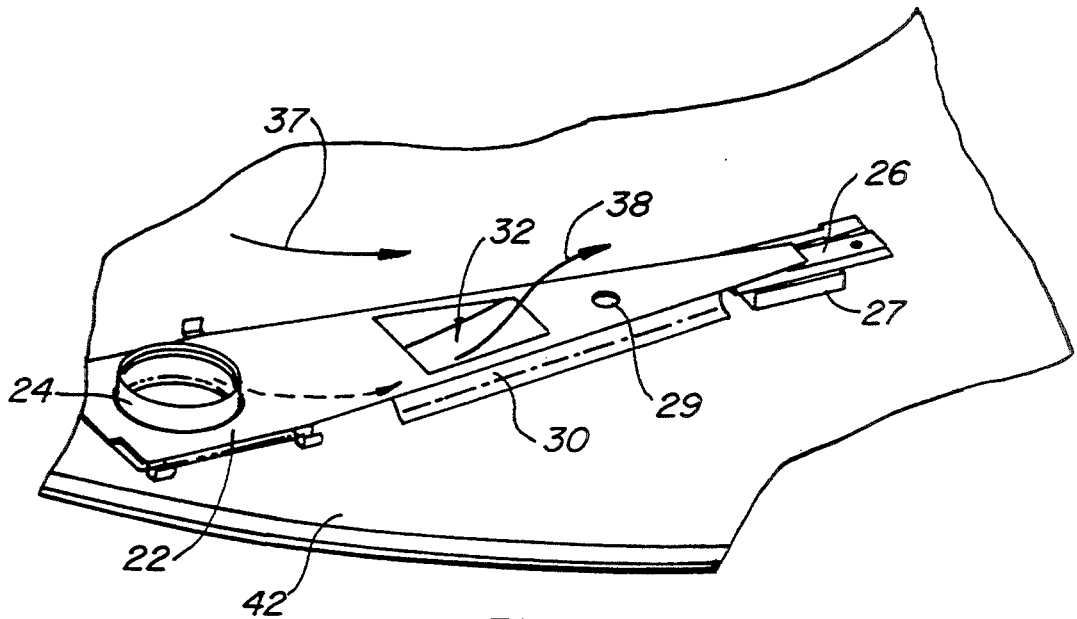
FIG. 6 is a perspective view of the head suspension arm assembly of the invention operatively associated with a data storage disk.

A significant aspect of the arm assembly 21 is the provision of an airfoil 32 formed integrally with the trapezoidal portion 23. Airfoil 32 has a downwardly curved portion 33 extending from the plane of the planar web toward the disk drive media, reversing curvature at a nadir position 34, and terminating in a free edge 35. The airfoil 32 provides a negative lift when air flows in the direction of arrows 37, 38 (see FIG. 6) so that the upwardly directed beam loading force is counter-effected. The actual shape of airfoil 32 is best determined on an empirical basis. In operation, the air bearing generates a positive lift on the head assembly 27 which, in concert with the beam loading force, opposes the negative lift of the airfoil 32. Thus, as the negative lift of the airfoil 32 urges the arm assembly closer to the disk surface 42, the air bearing effect of the head assembly 27 urges the head assembly to fly over the surface 42 at a sufficiently small height to facilitate operation of the read and write heads on the media. The lift of the head assembly 27 creates a dynamic equilibrium with the negative lift of the airfoil 32 to permit stable functioning of the head assembly.

When the disk drive is deactivated, the disk rotation diminishes and the velocity of the air film likewise decreases. The airfoil negative lift and the positive head lift taper off in equilibration, permitting the resilient loading force of the arm assembly to urge the arm assembly and the head assembly to move away from the disk surface 42. As the disk stops rotating, the head assembly is disposed at its maximum spacing from the disk, and it remains at the maximum spacing until another disk drive operating sequence draws the arm assembly and head assembly into operational proximity to the disk.

As will now be apparent, the invention eliminates both static and dynamic contact between the head and the media surface, while at the same time promoting the desired flying height conditions when the disk is rotated at the designed operating speed. Moreover, this advantage is obtained without the need of adding any additional mechanical or electronic components to the head suspension assembly, since the air foil 32 is preferably formed from the central portion of the trapezoidal portion 23 of the arm. Thus, the beneficial effects of the invention can be achieved at relatively low cost.

While the above provides a full and complete disclosure of the preferred embodiment of the invention, various modifications, alternate constructions and equivalents may be employed without departing from the spirit of the invention. For example, other airfoil shapes than those shown in the figures may be employed, as desired. Therefore, the above should not be construed as limiting the scope of the invention, which is defined by the appended claims.

What is claimed is:

1. In a head suspension assembly for a rotating disk data storage device that includes a suspension arm extending adjacent to a data storing surface of the disk and a head assembly supported at the distal end of the suspension arm, the suspension arm having a web section defining a nominal plane, the improvement comprising;

means for providing a resilient beam loading force to urge said suspension arm to diverge away from said surface of the rotating disk;

aerodynamic means for interacting with a film of air moving in a predetermined direction adjacent to the surface of the rotating disk and generating a negative lift force to counteract said beam loading force and urge said head assembly toward the surface of the rotating disk, said aerodynamic means including an airfoil formed on said suspension arm, said airfoil including a vane extending out of the nominal plane of said web section of said suspension arm and terminating in a free end facing upstream of said predetermined direction; and, air bearing means for interacting with said moving film of air adjacent to the surface of the rotating disk and generating a positive lift force to counteract said negative lift force of said aerodynamic means and maintain said head assembly at a stable operational height above the rotating disk.

2. The invention of claim 1 wherein said vane has an intermediate portion extending out of the nominal plane of said web section towards said surface of said disk.

* * * * *